United States Patent [19]

Adelberg

[11] E Re. 31,584

[45] Reissued May 15, 1984

[54] APPARATUS FOR REGULATING FLUID FLOW THROUGH PLASTIC TUBING

[76] Inventor: Marvin Adelberg, 16821 Oak View Dr., Encino, Calif. 91436

[21] Appl. No.: 256,707

[22] Filed: Aug. 10, 1981

Related U.S. Patent Documents

Reissue of:

[64] Patent No.: 3,685,787
Issued: Aug. 22, 1972
Appl. No.: 855,907
Filed: Sep. 8, 1969

[51] Int. Cl.[3] ..... F16K 7/06
[52] U.S. Cl. ..... 251/6; 251/7
[58] Field of Search ..... 251/4–10

[56] References Cited

U.S. PATENT DOCUMENTS

| | | | |
|---|---|---|---|
| 3,012,710 | 9/1963 | Dresden | 251/9 |
| 3,016,915 | 1/1962 | Moeller, Jr. | 251/6 |
| 3,078,501 | 2/1963 | Thorman | 251/8 X |
| 3,099,429 | 7/1963 | Broman | 251/6 |
| 3,189,038 | 6/1965 | Von Pechmann | 251/6 |
| 3,289,999 | 12/1966 | Konzak | 251/6 |
| 3,477,454 | 11/1969 | Fields | 251/4 X |
| 3,477,686 | 11/1969 | Engelsher et al. | 251/10 |

FOREIGN PATENT DOCUMENTS

| | | | |
|---|---|---|---|
| 108209 | 9/1964 | Spain . | |
| 13127 | of 1891 | United Kingdom | 251/9 |

*Primary Examiner*—Martin P. Schwadron
*Assistant Examiner*—Sheri Novack
*Attorney, Agent, or Firm*—Edward A. Sokolski

[57] ABSTRACT

The rate of flow of a fluid through plastic tubing is varied by clamping a portion of a circumferential section of the tube wall with sufficient force to fully close that part of the passage between the clamped wall portions, permitting fluid flow only through the resulting, remaining open cross-sectional area. Cold flow of the plastic material of the clamped portion of the tubing wall, such as might otherwise effect a change in the remaining cross-sectional flow area, is prevented or minimized by rigidly confining the clamped section. To adjustably vary the flow rate, the operative, passage-defining wall section of the tubing is varied by uniformly varying the ratio of the section of clamped tubing, and the remaining, operative wall portion of the tubing, or by deforming the operative wall portion.

9 Claims, 13 Drawing Figures

Fig. 1
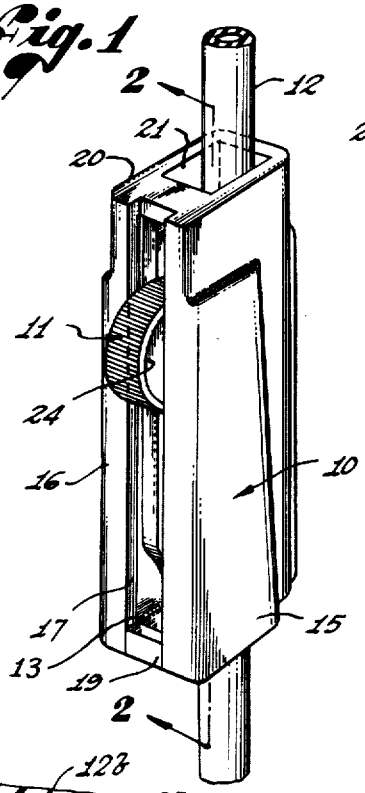
Fig. 3a
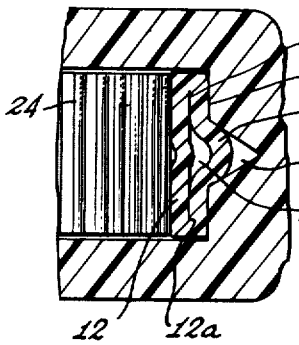
Fig. 2
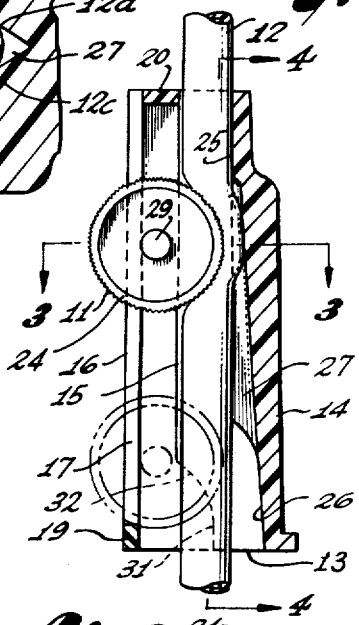
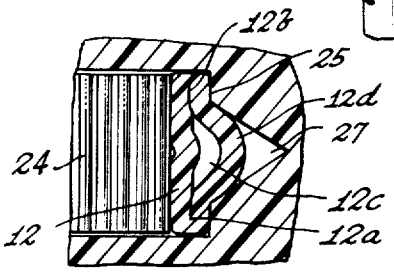
Fig. 3b
Fig. 3
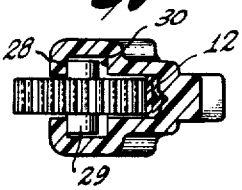
Fig. 6
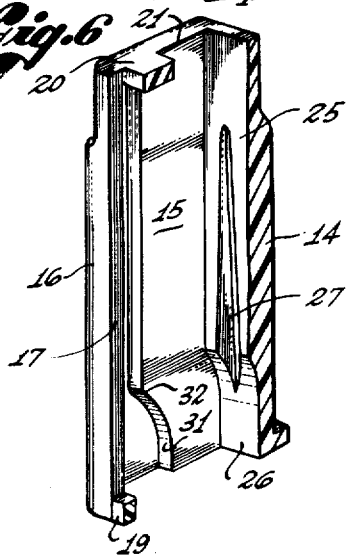
Fig. 4
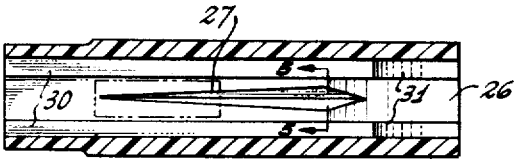
Fig. 5
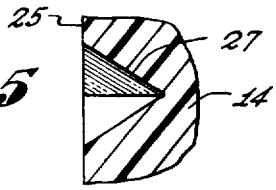

APPARATUS FOR REGULATING FLUID FLOW THROUGH PLASTIC TUBING

Matter enclosed in heavy brackets [ ] appears in the original patent but forms no part of this reissue specification; matter printed in italics indicates the additions made by reissue.

To minimize the variation of the flow rate of fluid with time, either none or a small amount of cold flow of the plastic is permitted in the operative wall portion of the tubing by relieving, within predetermined limits, the surface that receives the operative wall portion.

A body mounts a clamp in opposed relation to a clamping surface that is relieved by a channel. The plastic tubing has wall portions clamped between the clamp and clamping surface with sufficient force to fully close the passage through the clamped section while an operative, open wall portion of the tubing is received and confined in the channel. The clamping surfaces and body substantially fully enclose the clamped volume of tubing to minimize cold flow of the clamped plastic. In a roller clamp embodiment, shifting of the roller relative to a tapered channel varies the cross-sectional area in which the tubing is confined to vary the size of the effective opening of the tubing for a desired flow rate. In a cam clamp embodiment, the body mounts a piston acting transversely to the operative wall section of the tubing for selectively reducing the open cross-sectional area. For the case when it is desirable to have a flow rate to increase with time, the channel defining wall is so inclined relative to the clamping surface as to induce a sharp radius of curvature to induce cold flow of the plastic material and the channel is relieved, within limits, to accommodate the cold flow so that the open effective cross-sectional area increases with time with consequent increase of flow rate of time.

BACKGROUND OF THE INVENTION

The present invention relates to a process and device for regulating the flow of fluid through plastic tubing primarily, although not exclusively, in the administration of parenteral fluids.

For administering parenteral fluids, disposable single use kits have come into use. Typically, such kits include a length of flexible synthetic plastic tubing and a flow regulating device attached to the tubing for adjusting the delivery of the gravity flow of the parenteral fluid to the desired rate, which is typically on the order of 2 milliliters per minute.

Generally speaking, it is desired to maintain the flow rate of fluid constant with time. To this end, a variety of flow regulating devices have heretofore been devised and marketed. Generally, these comprise roller, pinch and screw clamps or the like which are adjusted to more or less constrict a given circumferential section of the synthetic plastic tubing to selectively choke the flow of the fluid therethrough. In these prior devices, the objective of maintaining a desired constant flow rate has been sought to be attained merely by devising the flow regulating device with positively acting mechanical means which are intended to maintain their adjusted position, more or less constricting the tube to attain a desired, effective, open cross-sectional area within the tube. However, the known devices apparently do not take into account the characteristic of the synthetic plastic known as "cold flow." In the prior devices, when the tubing is clamped, as a consequence of the induced strain or deformation, the plastic material apparently cold flows such that the resultant flow cross-sectional area, sometimes even a few minutes after having been subjected to the deformation, is significantly modified. A consequence of this phenomenon is that the liquid flow rate will vary even though there has been no mechanical change of the clamp configuration. As a result, the prior art devices must be constantly checked and re-adjusted because the flow will "drift" from its original settings. Furthermore, the presently used roll-clamps can be dislodged, or shifted in position by external disturbances. The consequences of this could be dangerous or disasterous since excessive flow rates may result.

SUMMARY OF THE INVENTION

The present invention provides a solution to the problem of accurately regulating the flow of fluids through synthetic plastic tubing. It also provides a more tightly positioned clamping method or device.

In the method of this invention, sections of the plastic tubing are manipulated in two distinctly different ways. First, at least one wall portion is securely clamped with sufficient force to completely close the original passage through these clamped sections. The remaining, unclamped portion or section defines a flow passage. By varying the ratio between the clamped and operative wall sections, the flow passage is adjusted to permit a flow rate of interest, or the operative wall section may be deformed to vary the cross-sectional area of the flow passage. The clamped wall sections are rigidly confined so that cold flow is positively prevented or minimized or, alternatively, clearances may be provided within the clamping means permitting cold flow of the plastic material of the tubing in regions other than the operative wall section of the tube.

In manipulating the operative wall cross-sectional area of the tubing, in order to choke the fluid flow to a desired rate, and where a constant flow rate is desired, the wall cross-sectional area of the operative section of tubing preferably is deformed with a relatively large radius of curvature to minimize strains such as might otherwise induce cold flow of the plastic material in the operative wall area. Where it is desired to have a flow rate through the operative tube cross-sectional area which varies with time, as for example, an increasing rate, the operative tube wall section is displaced about a relatively sharp radius and the surfaces employed for effecting the deformation are provided with a suitable relief such that opposed wall areas of the operative section will flow away from each other with time, to increase the effective open, or flow, cross-sectional area with time, with consequent increase in the flow rate. This last step may be employed individually, in combination with conventional clamping techniques in order to compensate for the flow inhibiting effects of cold flow resulting from clamping by these conventional methods. The controlled cold flow of this inventive step compensates for the hereto poorly regulated cold flow inherent in the prior clamping devices in order to achieve a net result of a substantially constant flow rate.

The above process may be embodied in a simple two-piece roll clamp comprising a hollow or channeled rigid body mounting a roller for rotation and translation lengthwise of the body. The plastic tubing is inserted through the body via an entrance ramp which merges into a clamping surface in which a longitudinally extending channel of varying cross-sectional area is located. The roller is in opposed relation to the clamping surface such that a pair of wall portions of the tubing are forcefully clamped between the roller and clamping surface, collapsing the clamped portions of the tubing in order to fully close the passage therethrough and also thereby tightly holding the tube. An operative wall portion of the tubing is received within the channel and the clamped wall and operative wall are divided in a proportion which varies with the position of the roller relative to the long axis of the channel. The channel defining walls are defined relative to the clamping surface such that the operative wall portion of the tubing is deformed on large or small radii, as desired, and in the latter case, with an appropriate relief inclination of the channel defining walls to accommodate cold flow of sharply bent wall areas within positive limits.

BRIEF DESCRIPTION OF THE DRAWING

FIG. 1 is a perspective view of a presently preferred embodiment of the flow regulating device of the present invention, shown in operative association with a section of plastic tubing.

FIG. 2 is a longitudinal sectional view taken on the line 2—2 of FIG. 1.

FIG. 3 is a transverse sectional view taken on the line 3—3 of FIG. 2.

FIG. 3a is a fragmentary sectional view, similar to FIG. 3 but on a larger scale.

FIG. 3b is a view similar to FIG. 3a but schematically illustrating the deformation of the plastic tubing occuring in a larger section of the channel in the floor of the clamping surface.

FIG. 4 is a longitudinal sectional view on the line 4—4 of FIG. 2.

FIG. 5 is a partial, transverse sectional view taken on the line 5—5 of FIG. 4, on a larger scale.

FIG. 6 is a perspective view of a longitudinal section of the clamp body.

DESCRIPTION OF THE PREFERRED EMBODIMENTS

Figure 7:
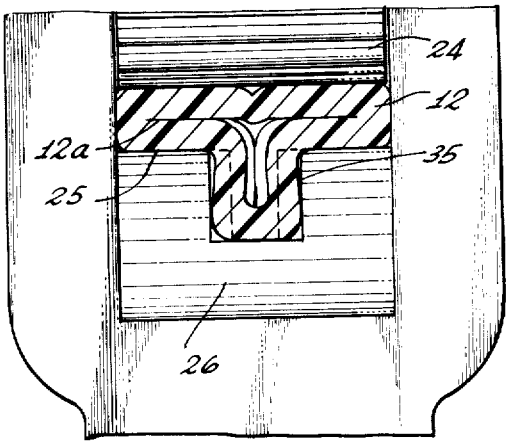
FIG. 7 is a fragmentary end view of an alternative embodiment of the invention, on an enlarged scale.

In general, my improved flow regulator comprises an elongated, relatively, but not necessarily rigid, hollow body 10 that mounts a roller 11, these two parts being adapted for clamping on a section of plastic tubing 12 that is fed through the body. Both parts are preferably molded from a synthetic, essentially rigid or semi-rigid plastic material and the body, in particular, given a configuration, such as that illustrated in the drawings, so that no significant deformation of the parts will occur when subjected to the substantial forces required to clamp the wall portions of the tubing 12 so as to close the passage through the clamped wall region.

More particularly, the body 10 is formed with an opening 13 at a tubing entrance end thereof, the opening being defined by a body floor 14, opposite sidewalls 15, and a top wall 16. An elongated slot 17 is formed in the top wall and is of sufficient width to admit the roller 11, with clearance, to permit rotation and translation of the roller longitudinally in the body 10. Adjacent the opening 13, the slot 17 is closed by a portion 19 of the top wall whereby the sidewalls 15 of the body 10 are braced at this end. The other end of the slot 17 terminates in an end wall 20 which rigidly innerconnects the sidewalls 15 at the corresponding end of the body and which is formed with an opening 21 therethrough of sufficient size to permit the tubing 12 to be withdrawn therethrough with clearance, as is indicated with FIG. 2. In order to further rigidify the body 10 against deformation due to the considerable clamping forces generated by the clamp, the opposite sidewalls 15 may be reinforced, for example, by longitudinally extending thickened wall portions 22. In some applications, the braces may be deleted, thus facilitating mounting of the clamp on the tube; with a tolerable loss of rigidity of the clamp.

The roller 11 is formed with a rim 24 that is preferably axially slotted or knurled in order to secure a better purchase on the tubing 12 and by the operator's thumb. The roller 11 is of such diameter that it can be put into the body 10 through the entrance opening 13 of the body, as indicated by the phantom outline positions of the roller 11 in FIG. 2. As is best seen in FIG. 6, the floor 14 of the body 10 is formed with a clamping surface 25 containing a channel 27 which is relieved adjacent the entrance opening 13 to define an entrance ramp 26 adapted to allow the roller 11 to be pushed into the body 10 with clearance or to slide through the opening 13.

Referring to FIG. 2, the inner surfaces of the top wall 16 longitudinally adjacent to the slot 17 define a pair of tracks 28 on which a pair of trunnions 29 of the roller 11 ride when the tube 12 is clamped between the roller and the clamping surface 25. As is best seen in FIG. 6, each of the interior surfaces of the sidewalls 15 is formed with a longitudinally extending shoulder 30 confronting one of the tracks 28 but the spacing between each shoulder 30 and its confronting, corresponding track 28 is sufficiently large to provide ample clearance for the diameter of the corresponding trunnion 29. Each of the shoulders 30 is relieved adjacent the entrance opening 13 of the body 10, as indicated at 31, to provide clearance for passage of the trunnions 29. If it is desired to maintain the roller 11 and body 10 in assembled condition prior to installation upon a piece of tubing 12, the juncture of each shoulder 30 with its relief 31, indicated at 32, may be so spaced relative to the top wall portion 19 as to create a very slight interference so that once the roller trunnions 29 have been forced into the channels above the shoulders 30 this interference will prevent the roller dropping out of the body 10.

In order to install a section of the tubing 12 into the flow regulator, one end of the tubing is inserted through the entrance opening 13 of the body 10. Preferably, at the time of insertion, the roller 11 is positioned adjacent the closed end 19 of the slot 17, i.e., opposite the widest portion of the channel 27, since this relationship of the roller to the clamping surfaces affords the greatest clearance for admission of the tubing.

As can be seen in FIGS. 3, 3a and 3b, the roller rim 24 is of a width or axial dimension to fit closely between the interior surfaces of the sidewalls 15 of the body. While a sliding fit of the roller rim within these interior walls may be employed, it is preferable to provide clearance, which clearance, however, is preferably maintained, on each side of the roller rim, to less than one-fourth the wall thickness of the tubing being handled. I have found that this relationship or clearance is sufficient to prevent any significant creep of the plastic material into the clearance between the wheel rim and the body.

After the tubing 12 has been fed into the body 10, the roller 11 is then advanced to a selected position relative to the length of channel 27 to reduce the effective open cross-sectional area within the tube to produce a desired flow rate. A substantially restricted flow rate results if the roller is positioned as is indicated by the solid outline in FIG. 2, further represented in FIGS. 3 and 3a. From these figures it will be observed that the roller 11 and clamping surface 25 coact to forcefully clamp a pair of wall portions of the tubing 12 between the roller rim 24 and clamping surface 25. The clamping force produced is sufficient to completely close the passage through the clamped portion of the tubing at 12a and 12b leaving a clear passage 12c that is primarily defined by an operative wall portion of the tubing 12d that is received in the corresponding portion of the channel 27. As a consequence of this operation the tubing is tightly held. To thus manipulate these portions of the tubing, it will be appreciated that the parts of the clamp must be properly proportioned. The space between the interior surfaces of the sidewalls 15 of the body 10 should be less than a dimension which is on the order of one-half the circumference of the outer surface of the tubing 12 and the space between the roller rim 24 and clamping surface 25 is usually less than twice the wall thickness of the wall tubing. With the parts thus proportioned, more or less of the wall of the tubing 12 is received in the channel 27 depending on the position of roller 11 relative to the channel (as will be seen from a comparison of FIGS. 3a and 3b) whereby the flow cross-sectional area is varied over the entire range of interest, including complete shut-off.

As is shown in FIG. 4, the channel 27 is longitudinally centrally disposed with respect to the clamping surface 25 and has a relatively large cross-sectional area at the entrance end in the entrance ramp 26. The channel is usually V-shaped in cross-section, although other configurations are used depending upon tube characteristics, being defined by a pair of angularly related convergent surfaces such that the channel decreases in depth and width forwardly from the entrance end of the channel, finally terminating at an apex disposed rearwardly of the front wall 20 of the body 10. As the roller 11 is advanced forwardly with respect to the channel 27, in the direction of reduced cross-sectional area of the channel, the total cross-sectional area available to the plastic tubing 12 is decreased at a uniform rate. At all positions of the roller 11 with respect to the channel 27, the plastic material being substantially totally confined, the possibility of cold flows such as would vary the desired size of opening through the tubing is minimized and well controlled. Furthermore, the tube is tightly clamped.

FIG. 7 shows an alternative embodiment of the flow regulator which is identical to the first embodiment except for the configuration of the channel formed within the clamping surface 25. In this alternative embodiment, there is a channel 35 in a similar location with respect to the clamping surface 25 defined by convergent sidewalls and a channel bottom that is parallel to the clamping surface. Like the channel 27, the channel 35 is longitudinally centrally disposed with respect to the clamping surface 25, having its wide end opening into the entrance ramp 26 and narrowing forwardly to an apex, or reduced width, preferably terminating rearwardly at or near the front wall 20 of the body. The sidewalls of the channel 35 are right angularly related to the clamping surface 25 and at the wide end of the channel, at the entrance ramp 26, are spaced apart less than a dimension whose magnitude is of the order of the nominal diameter of the tubing 12. At the other end of the channel 35, its width is less than or approximately twice the wall thickness of the tubing 12. As before, flow control is achieved by positioning the roller 11 with respect to the channel 35.

In this embodiment, the tubing 12 is forcefully clamped between the roller rim 24 and clamping surface 25 to, again, completely close the passages in the clamped portions at 12a and 12b. As the roller 11 is advanced forwardly with respect to the channel 35, it again positively decreases the total cross-sectional area available to the plastic tubing.

Figure 9:
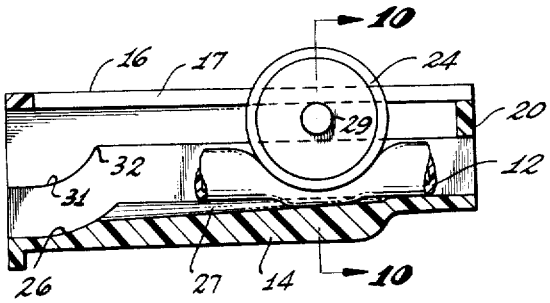
FIG. 9 is a longitudinal sectional view of a third alternative embodiment.
Figure 10:
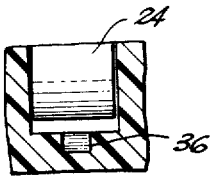
FIG. 10 is a partial sectional view of the line 10—10 of FIG. 9.

Essentially the same mode of manipulating the tubing 12 as occurs in the embodiment of FIG. 7 can be carried out with the channel modification of FIGS. 9 and 10. In this version, a channel 36, extending longitudinally, centrally of the clamping surface 25, is defined by parallel opposite sidewalls and a channel floor that is sloped upwardly and forwardly from the entrance ramp 26 towards the plane of the clamping surface. At its forward end, the channel floor may merge into the clamping surface 25, as shown in FIG. 9, or be slightly offset by a small step. Again, the total cross-sectional area available to the tubing 12 varies with the position of the roller 11 relative to the channel.

Figure 8:
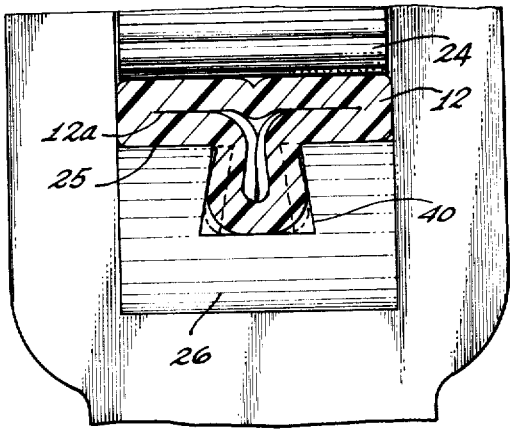
FIG. 8 is a fragmentary end view of a second alternative embodiment of the invention, on an enlarged scale.

Another embodiment of the invention is shown in FIG. 8. The device is the same as the previously described embodiments except that another configuration of channel 40 is formed in the clamping surface 25. As is indicated in FIG. 8, the channel 40 is again disposed longitudinally centrally of the clamping surface 25 from the entrance ramp 26 to an apex, or minimum width of the channel disposed rearwardly of and near the front wall 20 of the body 10. The channel 40 is of uniform depth from end to end. However, the opposite sidewalls of the channel 40 converge upwardly from the channel floor and also converge forwardly.

With the channel configuration of this embodiment, the operative wall area 12d of the tubing is usually, but not necessarily sharply bent about short radii, as in the embodiment of FIG. 7. However, as the opposite sidewalls of the channel 40 are downwardly divergent, the tubing wall portions are permitted to cold flow outwardly away from one another from the position shown in solid outline in the figure to the dotted outline position, but still within the positive limits of the channel sidewalls. Accordingly, the channel 40 provides controlled relief for the cold flow of the plastic material within the operative wall portion 12d of the tubing in order to increase by a prescribed small amount the open effective cross-sectional area 12c with time and this effect will tend to provide a gradually increasing fluid flow rate without mechanical change of the parts of the clamp. The channel 40 may be combined with conventional clamp features so that the flow rate reducing effects of the conventional clamp may be offset by the controlled cold flow rate increasing characteristics of the channel 40, such that the combination can result in a constant fluid flow rate.

Figure 11:
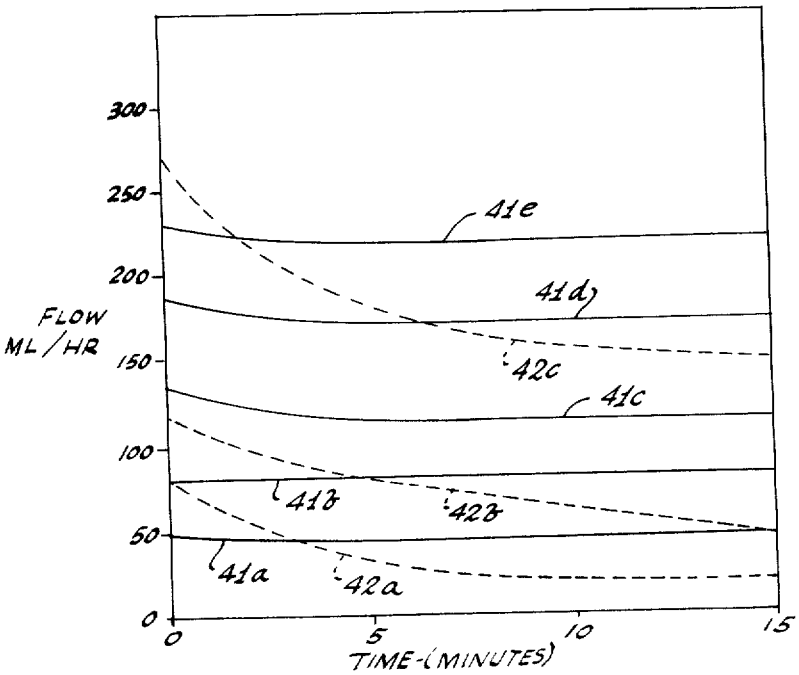
FIG. 11 is a chart illustrating the relative flow rates of an embodiment of the present invention as compared to certain previously available devices.

Typically, in the administration of parenteral fluids, it is desired to introduce these into the body of the patient at a constant rate. The graph of FIG. 11 is a comparison, with respect to constancy of flow rate, of a clamp of the type of FIGS. 1 through 6 with commercially available models of roll clamp and screw clamp, as employed on ostensibly identical specimens of plastic tubing. The lines 41a, b, c, d, and e indicate the variations in low rate in milliliters per hour with change in time in minutes at various nominal initial settings of the flow regulator of my invention. Curves 42a and b and c indicate the variations in flow rate with time from given initial settings for commercially available screw clamps and roll clamps, their performance being similar. It will be observed from the changing slope of curves 42a, b, and c, that there is a sharply decreasing initial flow rate produced by the clamps being of exponential character. In all of these cases, the diminution in flow rate is probably due to the cold flow of the plastic material of the tubing on which the corresponding clamp was mounted. Accordingly, in the use of these prior clamps, it was necessary for the attendant administering the parenteral fluid to make frequent checks of flow rate and adjustments of the clamp in order to achieve, ultimately, some rough approximation of the prescribed constant rate of administration of the fluid.

By way of contrast, it can be seen from lines 41a, b, c, d, e that with the flow regulator of the present invention the rate of flow drifts only very slightly from the initial setting of the clamp so that at most settings no, or very few, adjustments from the initial setting have to be made by the attendant in order to attain the desired constant rate of flow of the parenteral solution.

It will be appreciated that the present clamp exerts a very great clamping force sufficient to substantially collapse the clamped portions to fully close the passage of 12a and b. Accordingly, as a result of the stresses induced in the various surfaces, especially of the roller trunnions 29 on the tracks 28, the roller is very securely maintained in its selected position. As any mechanical change in position of the parts is effectively resisted, there will be no drift in the rate of administration of the parenteral solution. Furthermore, because of the strong clamping forces, the flow control device will not be easily disturbed when subjected to external perturbations.

While several embodiments of the invention have been described in detail, it will be appreciated that my invention can be embodied in other forms adapted to regulate fluid flow through plastic tubing, all within the purview of the method of this invention.

I claim:

1. A flow regulator for controlling the rate of flow of fluid through a flexible plastic tubing comprising:

a body formed with a passage to receive the tubing;

a clamping surface elongated in the direction of the tubing through said body and integrally formed in said body;

a clamping member mounted on said body for translation longitudinally of said body through a given distance above said clamping surface to unyieldingly define a clearance with respect to said clamping surface of substantially twice the nominal wall thickness of the tubing;

and an opening defining an elongated channel extending longitudinally in said clamping surface [to] *and into* which a portion of the wall in the tubing is forced by said clamping member, said body, said clamping surface, said clamping member, and said channel together defining a cross-sectional area smaller than the normal cross-sectional area included by the unclamped tubing and which varies between the ends of said channel as said clamping member is moved relative to said channel.

2. A flow regulator as in claim 1 in which:

said channel includes planar opposite sidewalls that converge from a wide end of said channel towards an apex of said channel;

said wide end of said channel having a width, in the plane of said clamping surface, of less than the nominal width of the tubing.

3. A flow regulator as in claim 2 in which said sidewalls of said channel are divergent in a direction away from said clamping surface.

4. A flow regulator as in claim 2 in which said sidewalls of said channel are convergent in a direction away from said clamping surface.

5. A flow regulator as in claim 1 in which said channel has a floor that is angularly related to the longitudinal axis of said clamping surface.

6. A flow regulator for controlling the rate of flow of fluid through a flexible plastic tubing comprising:

a body formed with a passage to receive the tubing;

a clamping surface integrally formed in said body;

a clamping member mounted on said body to unyieldably define a clearance with respect to said clamping surface of substantially twice the nominal wall thickness of the tubing;

and [an opening] *a channel* in said clamping surface into which a portion of the wall in the tubing is forced by said clamping member;

said clamping surface, said clamping member and said [opening] *channel* together defining a cross-sectional area smaller than the normal cross-sectional area included by the unclamped tubing, said clamping member comprising a roller supported on track means formed in said body to clamp a wall portion of the tubing between a rim of said roller and said clamping surface;

said track means being parallel to said clamping surface to unyieldably constrain said roller to movement of said rim in a manner to maintain said clearance.

7. A flow regulator as in claim 6 in which:

said channel is disposed symmetrically with respect to said clamping surface and with its longitudinal axis of symmetry within a plane including the median plane of said roller whereby to define a pair of clamping shoulders longitudinally adjacent to opposite sides of said channel against which wall portions of the tubing are clamped by axially opposite end portions of said rim of said roller while said channel receives a remaining unclamped portion of the tubing.

8. A flow regulator as in claim 7 in which:

said body is formed with a longitudinally extending passage to receive the tubing and said roller;

said passage having a width less than one-half the normal circumference of the tubing;

said roller rim and said passage being adapted to rigidly confine substantially all wall portions of the tubing that are clamped by said roller against said clamping surface.

9. A flow regulator as in claim 8 in which the clearance between each of the axially opposite ends of said roller and said passage are less than one-half the wall thickness of the tubing.

* * * * *